United States Patent
Kelemen et al.

(10) Patent No.: US 8,062,386 B2
(45) Date of Patent: Nov. 22, 2011

(54) TIN-PLATED ANODE CASINGS FOR ALKALINE CELLS

(75) Inventors: Marc P. Kelemen, Westlake, OH (US); Jingdong Guo, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1201 days.

(21) Appl. No.: 11/811,092

(22) Filed: Jun. 8, 2007

(65) Prior Publication Data

US 2007/0283558 A1    Dec. 13, 2007

Related U.S. Application Data (60) Provisional application No. 60/811,825, filed on Jun. 8, 2006.

(51) Int. Cl.
*H01M 10/04* (2006.01)
(52) U.S. Cl. .................. 29/623.5; 205/300; 429/433
(58) Field of Classification Search .................. 29/623.5; 205/300; 429/433, 443, 452, 479, 483
See application file for complete search history.

(56) References Cited

U.S. PATENT DOCUMENTS

| | | | |
|---|---|---|---|
| 3,515,653 A | 6/1970 | Sykes | |
| 6,060,196 A | 5/2000 | Gordon et al. | |
| 6,521,103 B2 | 2/2003 | Harris et al. | |
| 6,602,629 B1 | 8/2003 | Guo et al. | |
| 6,830,847 B2 | 12/2004 | Ramaswami et al. | |
| 2003/0211387 A1 | 11/2003 | Braunger et al. | |
| 2006/0096867 A1* | 5/2006 | Bokisa et al. | 205/253 |
| 2006/0246353 A1 | 11/2006 | Guo et al. | |
| 2008/0102360 A1* | 5/2008 | Stimits et al. | 429/131 |

FOREIGN PATENT DOCUMENTS

| | | |
|---|---|---|
| EP | 1138805 A | 10/2001 |
| JP | 50-134137 A | 10/1975 |
| JP | 07-057705 A | 3/1995 |

OTHER PUBLICATIONS

Patent Cooperation Treaty (PCT), International Search Report and Written Opinion for Application PCT/US2007/013628 filed Jun. 8, 2007, mailed Dec. 18, 2007, 12 pgs., European Patent Office, Netherlands.
Technic Inc., Technic Pure Tin Processes, 2003, 1 pg., downloaded Nov. 5, 2007, http://www.technic.com/chm/tin.htm.
Technic Inc., Technic Equipment Overview, 2003, 1 pg., downloaded Nov. 5, 2007, http://www.technic.com/eqp/equip.htm.
Technic Inc., Technistan JB 3000, Technical Bulletin ATD401615TB-Rev. 5, Nov. 2004, 18 pgs.

* cited by examiner

*Primary Examiner* — Jennifer Michener
*Assistant Examiner* — Monique Wills
(74) *Attorney, Agent, or Firm* — Russell H. Toye, Jr.

(57) ABSTRACT

An anode casing having a bright tin or bright tin alloy surface layer at least on an inside surface of the casing, preferably on the entire surface of the anode casing, and to an electrochemical cell containing the anode casing. Methods for preparing anode casings and electrochemical cells containing the anode casings are disclosed. In a preferred embodiment, the anode casings are plated at high current density utilizing a variable contact rack plating process, wherein portions of a clamp assembly of the device variably or alternately contact different portions of the anode casing so the entire surface of the anode casing is plated. The bright tin-plated surface is a high hydrogen-overvoltage metal that reduces gassing in cells using the casings.

31 Claims, 2 Drawing Sheets

TIN-PLATED ANODE CASINGS FOR ALKALINE CELLS

CROSS-REFERENCE TO RELATED APPLICATIONS

This application claims the benefit of U.S. Provisional Application No. 60/811,825, filed Jun. 8, 2006, entitled Tin-Plated Anode Casings for Alkaline Cells.

FIELD OF THE INVENTION

The present invention relates to an anode casing having a tin outer surface layer at least on an inside surface of the casing, preferably on the entire outer surface of the anode casing, and to an electrochemical cell containing the anode casing. Methods for preparing anode casings and electrochemical cells containing the anode casings are disclosed.

BACKGROUND OF THE INVENTION

Electrochemical cells, such as prismatic cells and button cells, can be utilized in a variety of electronic devices. Alkaline prismatic cells are well suited for use in devices including wireless devices such as a keyboard or a mouse, MP3 players, flash MP3 players, and BLUETOOTH® wireless headsets. Alkaline button cells, such as zinc-manganese dioxide and zinc-silver cells, are often used in small devices such as watches and hand-held calculators, and zinc-air cells are particularly useful in electronic hearing aids. Commercial alkaline cells typically comprise a negative electrode (anode) including an anode casing and a positive electrode (cathode) including a cathode casing. Both the anode casing and the cathode casing have similarly-shaped bodies such as a pan or a cup, each with a closed end and an open end generally opposite the closed end. The negative electrode typically employs zinc or a zinc alloy as the active material and an alkaline electrolyte, such as potassium hydroxide. The anode casing is inserted into the cathode casing after all of the cell materials are placed at desired locations within the anode and cathode casings, with electrical insulating material therebetween, wherein the cell is sealed generally by crimping. In the past, mercury was utilized in the negative electrode active material mixture to improve electrical conductivity within the negative electrode and to reduce hydrogen gassing which can occur in the cell during discharge, as well as during storage and periods of non-use. Due to concerns regarding the environment and the health of humans and animals, it is desirable to substantially decrease or eliminate mercury from all electrochemical cells, including button cells.

The elimination of mercury without making any other changes to the cell can result in cell leakage caused by one or more of gassing within the cell, capillary action of the sealing areas, electrochemical creepage driven by the potential difference within the cell, and a damaged cell sealing component. Furthermore, pressure within button zinc-air cells can cause delamination of the hydrophobic layer from the air electrode, which creates void space, causing electrolyte to accumulate therein. This accumulation of electrolyte results in a barrier for air to reach the air electrode of the cell.

Numerous different approaches have been taken in an attempt to eliminate the leakage problem in button-type cells, while substantially decreasing or eliminating the mercury content of the cell at the same time.

U.S. Pat. No. 6,830,847 to Ramaswami et al. relates to a zinc-air button cell comprising a cathode casing and an anode casing wherein the anode casing is inserted into the cathode casing. The anode casing is formed of multi-clad metal layers, for example nickel/stainless steel/copper. A reportedly protective metal is plated onto the exposed peripheral edge of the anode casing. The metal is desirably selected from copper, tin, indium, silver, brass, bronze or gold.

U.S. Pat. No. 6,602,629 to Guo et al. discloses an improved button air cell that contains zero mercury, is free of indium on the sealing surface of the anode cup, and has an active material comprising zinc alloyed with lead. Indium or another metal with a higher hydrogen overvoltage can be put onto the interior surface of the anode cup or portions of the inner surface that are not in the seal area.

U.S. Patent Application Publication No. 2003/0211387 to Braunger et al. relates to a galvanic element with an alkaline electrolyte and a zinc negative electrode, in a housing in the form of a button cell, wherein at least the outer layer of the cell's cap is coated with a Cu—Sn-alloy containing no nickel or with a Cu—Sn—Zn-alloy containing no nickel. The same coating can also be applied to the inner surface of the cap, the inner surface of the other half of the cell housing, its cup, and the outer surface thereof is also coated with the same material, if necessary.

U.S. Pat. No. 6,060,196 to Gordon et al. relates to a zinc alloy anode-based electrochemical cell, which generates gases and/or energy. The structure of the cell is such that a zinc alloy anode material is the integral part of housing and is in contact with an alkaline electrolyte containing minor amounts of corrosion inhibitors. The zinc anode cap is a zinc alloy containing at least one metal from the group consisting of lead, indium, cadmium, bismuth, and combinations thereof. The zinc cap has a copper, tin, or stainless steel clad outer layer to reportedly protect the zinc anode from atmospheric corrosion.

Japanese Laid-Open Publication No. 07-057705 to Toshiba Battery Co. Ltd. relates to a battery that uses non-amalgamated zinc as a negative active material and an alkaline electrolyte and has a sealing plate which also serves as a negative current collector inside a positive case. The sealing plate is formed with a copper/stainless steel/nickel three layer clad material, and then part or the whole of the sealing plate is covered with lead, tin, indium, or bismuth, or an alloy by electroless plating or electrolytic plating. It is reported that cracks or pinholes on the surface produced on formation are covered to eliminate an active site for hydrogen gas evolution to retard the hydrogen gas evolution by covering with the metal with high hydrogen over potential.

Japanese Laid-Open Patent Application No. 50-134137 to Toshiba Ray O Vac Co. discloses that the rim part of a nickel plated anode sealing plate, which attaches to the insulator packing of the plate, is coated with nitrogen oxides. The nitrogen oxide treatment reportedly prevents electrolyte leakage.

Various problems have been encountered when plating anode casings by processes such as electrolytic plating or electroless plating, or both. Examples of such problems include anode casing finishes having a hazy, cloudy, matte, or the like appearance which is undesirable and can result in greater amounts of gassing than a more desirable appearance; anode casings having scratches, cuts, or the like that can result in an undesirable appearance and increased gassing if a substrate having a lower hydrogen overvoltage is exposed; nesting of anode casings during the plating process, resulting in incomplete, or non-uniform plating, or a combination thereof; casings sticking to each other, such as between flat surfaces thereof, due to surface tension of the plating solutions or casings floating in the plating solution, and combinations thereof which can cause incomplete or non-uniform plating, or a combination thereof; improper flow of anode casings in a plating device during plating; and casings having damaged areas such as bent and warped areas.

SUMMARY OF THE INVENTION

In view of the above, the invention can provide one or more of the advantages described below.

The invention can provide an electrochemical cell, such as a prismatic-type cell or button-type cell that is free of added mercury, highly resistant to leakage and salting, yet cost effective to manufacture and commercialize, and exhibits satisfactory electrical performance.

The invention can provide an anode casing for an electrochemical cell having a tin outer layer located at least on the inside of the surface of the anode casing that provides a relatively low rate of hydrogen gassing when compared to prior art anode casings without the tin layer. The tin layer is preferably deposited as a continuous, smooth, uniform layer free of contaminants on all surfaces of the casing, including any surface that may come in contact with electrolyte in the cell, including the anode casing cut edge.

The invention can provide electrochemical cells with an anode casing having a tin outer layer on at least the inside surface of the anode casing, wherein the cell has no added mercury.

The invention can provide the anode casing with a bright plated metal surface layer, preferably on the entire surface of the anode casing, wherein the metal surface layer is a high hydrogen-overvoltage metal comprising tin or a tin alloy.

The invention can provide an anode casing having a post-plated layer after forming that is free of defects such as pinholes, scratches, and unplated areas through which the substrate can be exposed to the cell electrolyte that can result in increased gassing.

The invention can provide methods for forming an anode casing having a tin layer at least on the inside surface of the anode casing, as well as methods for preparing electrochemical cells containing the disclosed anode casings of the invention. In a preferred embodiment, the method includes plating a layer of tin on at least an inside surface of the anode casing utilizing a variable contact rack plating device that selectively engages and disengages portions of the anode casing while in a plating solution so that the entire surface of the anode casing is plated.

One aspect of the invention is an electrochemical battery cell having a housing including a positive electrode casing and a negative electrode casing, a positive electrode, a negative electrode containing zinc, and an aqueous alkaline electrolyte. The negative electrode casing includes a metal substrate, a bright electroplated surface layer including tin and having a hydrogen overvoltage greater than that of copper, and a layer including copper beneath the surface layer.

A method of manufacturing an electrochemical cell comprising the steps: (a) providing a sheet comprising a steel layer as a substrate; (b) forming a negative electrode casing from the substrate; (c) electroplating a layer comprising bright tin and having an average thickness from 1 to 10 micrometers onto the substrate, using a rack plating process with variable contact holding of the negative electrode casing and an electroplating current density from 538 to 2691 amps per square meter; (d) depositing a negative electrode material comprising zinc and an aqueous alkaline electrolyte in a concave portion of the negative electrode casing such that the negative electrode material is in contact with the tin layer on the negative electrode casing; and (e) combining the negative electrode casing and the negative electrode material with a positive electrode and a positive electrode casing to form a sealed cell.

A method of manufacturing an electrochemical battery cell comprising the steps: (a) providing a sheet comprising a non-clad steel layer as a substrate; (b) forming a negative electrode casing from the substrate; (c) cleaning the negative electrode casing, and then rinsing the cleaned negative electrode casing; (d) electroplating an intermediate strike layer having an average thickness from 0.5 to 1.0 micrometers and comprising copper on the cleaned and rinsed negative electrode casing using a rack process with variable contact holding of the negative electrode casing; (e) electroplating a layer comprising bright tin and having an average thickness from 1 to 10 micrometers onto the substrate, using a rack plating process with variable contact holding of the negative electrode casing and an electroplating current density from 538 to 2691 amps per square meter; (f) depositing a negative electrode material comprising zinc and an aqueous alkaline electrolyte in a concave portion of the negative electrode casing such that the negative electrode material is in contact with the tin layer on the negative electrode casing; and (g) combining the negative electrode casing and the negative electrode material with a positive electrode and a positive electrode casing to form a sealed cell.

A method of manufacturing an electrochemical battery cell comprising the steps: (a) providing a substrate comprising a sheet with a layer comprising copper clad to a layer of steel; (b) forming a negative electrode casing from the substrate, with the layer comprising copper on a concave surface of the negative electrode casing; (c) cleaning a surface of the layer comprising copper; (d) electroplating a layer comprising bright tin and having an average thickness from 1 to 10 micrometers on the cleaned surface of the layer comprising copper, using a rack process with variable contact holding of the negative electrode casing and an electroplating current density from 538 to 2691 amps per square meter; (e) depositing a negative electrode material comprising zinc and an aqueous alkaline electrolyte in a concave portion of the negative electrode casing such that the negative electrode material is in contact with the tin layer on the negative electrode casing; and (f) combining the negative electrode casing and the negative electrode material with a positive electrode and a positive electrode casing to form a sealed cell.

These and other features, advantages and objects of the present invention will be further understood and appreciated by those skilled in the art by reference to the following specification, claims and appended drawings.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

An anode casing of the present invention is utilized in an electrochemical cell, such as a button, cylindrical, flat or prismatic cell. The cell can be one of any electrochemical system for which it is desirable to plate the formed anode casing with tin. Preferred cell types are those that contain an aqueous alkaline electrolyte, such as alkaline cells that contain zinc as a negative electrode active material, examples of which include cells that include one or more of manganese dioxide, nickel oxyhydroxide, silver oxide, and oxygen as a positive electrode active material. In a preferred embodiment, the cell is a fluid-depolarized cell with a catalytic electrode. The fluid utilized by the cell is preferably a gas such as oxygen from the surrounding atmosphere. Fluid depolarized electrochemical cells include metal-air cells, such as zinc-air cells (also referred to below as air cells).

While the cells of the present invention can include added mercury, for example about 3% mercury based on the weight of zinc, it is desirable that the only mercury contained in the preferred cells of this invention is that which is naturally present in the cell components. That said, in a preferred embodiment, the cells of the present invention include mercury in an amount generally less than 50 parts per million by total weight of the cell, desirably less than 10 parts per million, preferably less than 5 parts per million, and more preferably less than 2 parts per million. U.S. Pat. No. 6,602,629 to Guo et al., herein fully incorporated by reference, discloses the method used to determine the total level of mercury in a cell.

The flat cells or prismatic cells of the invention are typically rectangular in shape, but are not limited thereto, and can be square with a length substantially equal to a width of the cell, or otherwise can be non-cylindrical in shape. The invention can be used with any anode casing designed to be in contact with anode active material. The invention is most useful for anode casings that cannot be effectively plated using a more cost effective process such as a spouted bed electrode plating process. In general, cells with a maximum diameter or length greater than about 11.6 mm cannot be effectively plated using a spouted bed process. In preferred embodiments, cells of the present invention have maximum length, width and height dimensions, where the maximum lengths range from about 22 to about 53 mm, the maximum width dimensions range from about 10 to about 32 mm, and the maximum height dimensions range from about 4 to about 5 mm. The anode casings in these embodiments can range from about 21 to about 52 mm in length, from about 9 to about 31 mm in width, and from about 3 to about 4 mm in height.

The button-type cells of the invention are generally cylindrical in shape and have maximum diameters that are greater than their total heights. The maximum diameter is generally between about 4 mm to about 35 mm, desirably from about 5 mm to about 35 mm. Preferably the maximum diameter is no greater than about 30 mm and more preferably no greater than about 20 mm. The button-type cells have a maximum height or thickness, measured perpendicular to the diameter, generally from about 1 mm to about 20 mm, desirably from about 1 mm to about 15 mm. Preferably the maximum height is no greater than about 10 mm and more preferably no greater than about 8 mm. Alkaline zinc-air button cells of the present invention include, but are not limited to, International Electrotechnical Commission (I.E.C.) International Standard designations of PR41, PR44, PR48, PR63 and PR70. Alkaline zinc-silver oxide cells include, but are not limited to, IEC 300-series cells as well as IEC 13- and IEC 76-size silver oxide cells.

Figure 1:
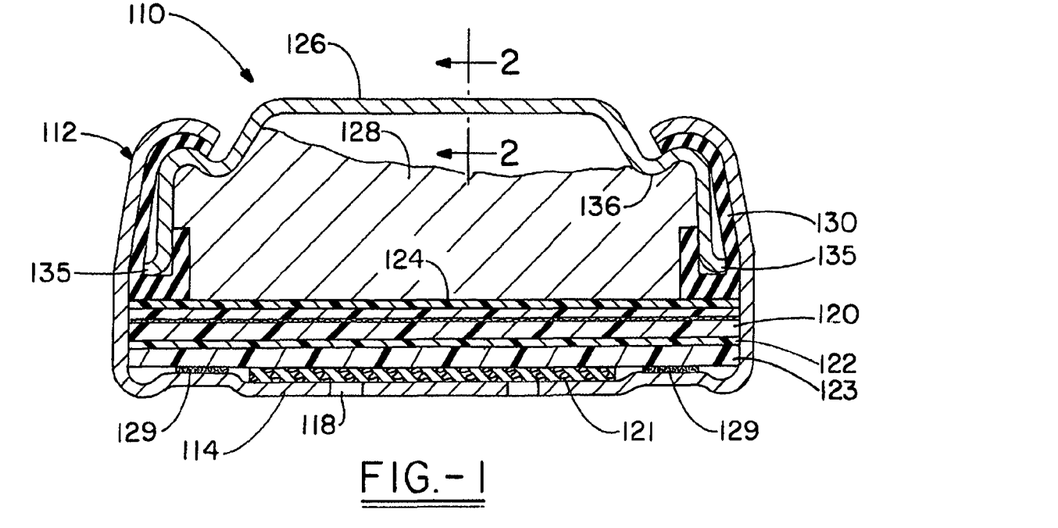
FIG. 1 is an elevational view, in cross-section, of a prismatic-type air electrochemical cell having an anode casing.

A preferred embodiment of a prismatic cell 110 including an anode casing 126 of the present invention is shown in FIG. 1. The cell 110 illustrated is an air cell that includes cathode casing 112, preferably formed of nickel-plated steel. Anode casing 126 and cathode casing 112 are generally prismatic-shaped, and preferably rectangular, with each casing 126, 112 defining four linear or nonlinear sidewalls connected to a base or central region, preferably substantially planar. Alternatively, casing 112 can have a base with an area that protrudes outward from the peripheral part of the casing base. The casings, generally the cathode casing, can include single or multiple steps if desired.

Figure 3:
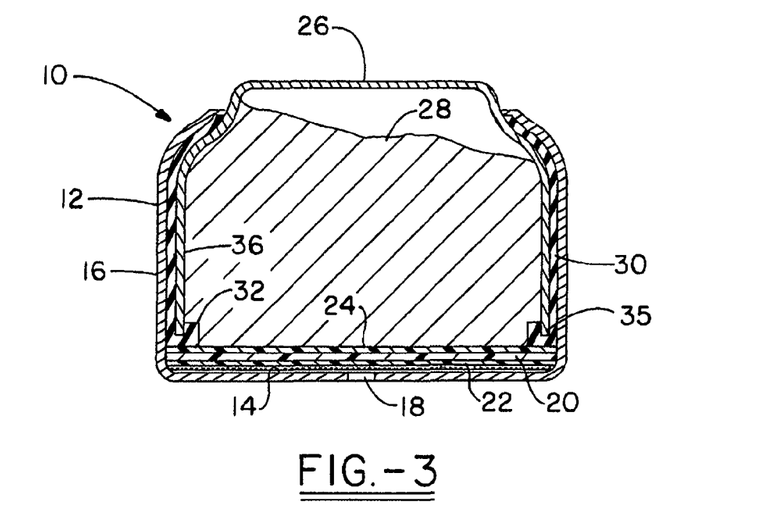
FIG. 3 is an elevational view, in cross-section, of a button-type air electrochemical cell having an anode casing with an outer layer of tin on the inside surface of the casing.

A preferred embodiment of a button cell 10 including an anode casing 26 that is generally a cup-shaped metal component is illustrated in FIG. 3. Cell 10 shown in FIG. 3 is an air cell that includes a cathode casing 12 that is cup-shaped, and is preferably formed of nickel-plated steel such that it has a relatively flat central region 14 which is continuous with and surrounded by an upstanding wall 16 of uniform height. Alternatively, in one embodiment the central region 14 of the can bottom may protrude outward from the peripheral part of the can bottom. At least one hole 18 is present in the bottom of cathode can 12 to act as an air entry port.

Figure 2:
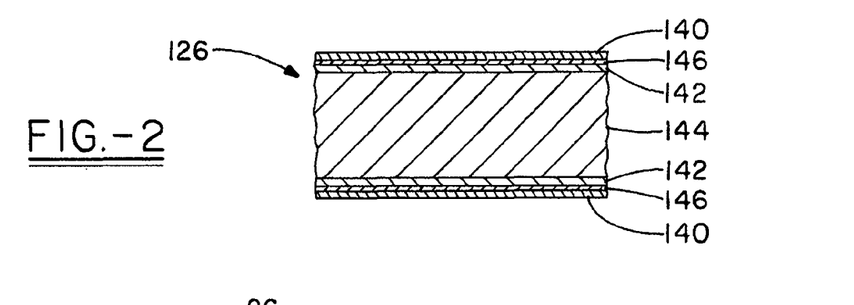
FIG. 2 is an enlarged cross-sectional view through the material construction of the anode casing at line 2-2 of FIG. 1, illustrating one embodiment of a layer system for the anode casing.

Referring now to FIGS. 1 through 3 regarding the further description of electrochemical cells of the present invention, a positive electrode, such as air electrode 20, 120 is disposed near the bottom of the cathode casing 12, 112. The air electrode 20, 120 may be any material suitable for use in an air electrode, but is preferably a mixture of carbon, manganese oxide ($MnO_x$), and polytetrafluoroethylene (PTFE). The mixture also optionally contains a surfactant often present in the PTFE. Air electrode 20, 120 also preferably has a polytetrafluoroethylene (PTFE) layer 22, 122 laminated thereon. The PTFE layer 22, 122 is laminated on the underside (near the bottom of the cell) of air electrode 20, 120 as shown in FIGS. 1 and 3. Air electrode 20, 120 also preferably contains a metal screen, preferably made of nickel expanded metal, embedded therein on the opposite side of the air electrode 20, 120 from the PTFE laminated layer 22, 122. The air electrode 20, 120 may also optionally contain a barrier membrane 123, such as a PTFE film, between PTFE layer 22, 122 and flat central region 14, 114 of the bottom of the casing 12, 112. At least one layer of separator 24, 124 is positioned above air electrode 20, 120. Preferably, a layer of porous material 121 is positioned between air electrode 20, 120 and the bottom of casing 12, 112 to evenly distribute air to electrode 20, 120. A sealant 129 such as a thermoplastic hot melt adhesive, for example SWIFT® 82996 from Forbo Adhesives, LLC of Research Triangle Park, N.C., USA can be used to bond portions of the cathode to cathode casing 112.

Cell 10, 110 also includes anode casing 26, 126 which forms the top of the cell. The anode casing 26, 126 is preferably formed from a substrate including a material having a sufficient mechanical strength for the intended use, wherein the substrate also has the ability to be plated with a conductive metal. The casing substrate in one embodiment is a single layer of material such as, but not limited to steel (e.g., stainless steel, mild steel, or cold rolled steel), aluminum, titanium, or copper, with mild steel preferred. In a preferred embodiment, the anode casing substrate is pre-plated, that is plated prior to being formed into a casing, or clad with at least one additional layer. Preferred pre-plating and clad materials include, but are not limited to, nickel, copper, indium, tin and combinations thereof that can serve to prevent corrosion of the substrate before the anode casing is post-plated with a strike layer and/or a tin layer of tin or a tin alloy after forming the casing. Pre-plated or clad layers, or both, also provide an advantage of preventing any pinholes, damage, or other defects in the post-plated layer from exposing a lower hydrogen overvoltage substrate material, as well as promoting adhesion with subsequently applied layers. Alternatively, the materials used to form the anode casing or the formed anode casing, or both, can be stored in a closed environment in the presence of a corrosion inhibitor, prior to post-plating the formed casings with a tin layer of tin or a tin alloy.

In one preferred embodiment, the substrate material comprises nickel-plated steel, preferably nickel-plated mild steel. As used herein, a mild steel is a low carbon steel containing from about 0.15 to about 0.30 weight percent carbon and less than about 0.75 weight percent manganese. The nickel layer 142, when no exterior tin layer is present thereon, protects the exterior surface of the steel strip 144 and is on both sides of the steel 144 as illustrated in FIG. 2. Therefore, from exterior to interior, the anode casing 126 prior to post-plating is preferably Ni/mild steel/Ni. Other laminated materials may be used to form the anode casing 26, 126, including a bilaminate of copper on a stainless steel substrate or a laminate made of more than three layers.

Examples of other plated materials or clad materials (i.e., laminar materials with at least one layer of metal bonded to another layer of metal) that can be used to form anode casing 26, 126 include, as listed in order from an outer layer to an inner layer, other three layered materials, such as nickel/stainless steel/copper, biclad materials, such as stainless steel/copper, and four layer materials, such as nickel/stainless steel/nickel/copper, before the layer of tin is plated on a surface of the anode casing 26, 126.

The anode casing 126 can also be provided with a strike layer 146 or optional additional preplated layer, preferably utilizing the variable contact rack plating device such as described hereinbelow. A preferred strike layer or preplated layer is copper which promotes adhesion between the anode casing 126 and the tin layer.

The anode casing 26, 126 is plated with a layer of tin or a tin alloy at least on the inner surface 36, 136 of anode casing 26, 126. Preferably, substantially the entire surface of the anode casing 26, 126 is plated with a layer of tin or tin alloy. The tin or tin alloy layer provides a relatively high hydrogen overpotential metal on the inside surface of the anode casing that reduces or prevents gassing by the anode casing within the cell. Examples of suitable tin alloys include, but are not limited to, alloys of tin with at least one of copper and zinc (such as copper, tin and zinc in a ratio of about 58:32:10 by weight or tin and zinc in a ratio of 75:25 by weight). In a preferred embodiment the tin content is greater than 50 weight percent of the tin alloy, such as pure tin (i.e., non-alloyed, containing less than 1 percent by weight total impurities and preferably less than 10 parts per million each of chromium, iron, molybdenum, arsenic, antimony, vanadium, cadmium, copper, nickel and aluminum). In a preferred embodiment, the entire exterior surface of anode casing 26, 126 is plated with a layer of tin 140 as shown in FIG. 2. In a preferred embodiment the tin or bright tin alloy layer is a bright tin or tin alloy layer. As used below, a tin layer may contain pure tin or an alloy including tin, unless otherwise indicated. Preferably, the surface of the bright tin layer will be free of visible spots or stains, to provide the greatest resistance to gas producing reactions within the cell.

As used herein, a bright tin layer is a layer that includes tin or a tin alloy produced by a plating process in which a brightening agent is used in the plating bath, according to ASTM B545-97, section 4.3.2. A brightener controls metal deposition on a microscopic level by inhibiting the normal tendency of the plating bath to preferentially plate high points on the surface, which have higher electro-potentials. A brightener can be attracted to and temporarily block points of high potential, forcing metal ions to deposit elsewhere and then dissipating as the local points of high potential disappear. This prevents the formation of clumps of metal and produces a very smooth surface. Desirably, the surface of the bright tin layer will have a reflectance specular excluded Y parameter value on the CIE (Commission on Illumination) 1931 color space from about 1 to about 40, preferably no greater than about 20, more preferably no greater than about 15, and most preferably no greater than about 10. The reflectance specular excluded Y parameter value can be determined by testing with a sphere spectrophotometer (available from X-Rite, Inc., Grandville, Mich., USA) in the Reflectance Specular Excluded mode, calibrated to a scale from 0 to 100, where 0 represents the maximum reflectance and 100 represents no reflectance.

In a preferred embodiment, the anode casing substrate material, optionally pre-plated or clad, is formed into a desired shape of the anode casing 26, 126, preferably provided with a strike layer, optionally plated with a further metal layer, and then electrolytically post-plated with at least a layer of tin on substantially the entire surface of the anode casing 26, 126. The anode casing 26, 126 is preferably formed using a stamping process. In a preferred embodiment, the anode casing 26, of a button cell is formed as a cup from a portion of a coil of desired material using three or more progressively sized stamping dies, after which the anode cup is punched out of the coil. Using two or less dies to form an anode casing may contribute to undesirable gas production in the cell produced therewith. In one embodiment, at least the inner surface 36, 136 and ends 35, 135 of anode casing 26, 126 are plated with a layer of tin. In a preferred embodiment, the entire surface area of the anode casing 26, 126 is tin plated. Preferring plating methods are described hereinbelow.

The mild steel, cold rolled steel, or other alternative preferred steel of the anode casing substrate material provides structural rigidity and is present preferably at a thickness of about 97.6% based on the total thickness of the particular anode casing 26, 126 utilized. The thickness of each nickel layer of the anode casing substrate material, independently, is preferably about 1.2% based on the total thickness of the anode casing 26, 126. All values listed are prior to tin plating and the addition of a strike layer or other layer(s) applied after the anode casing is formed using process such as stamping.

During manufacture of the cell, anode casing 26, 126 is preferably inverted, and then a negative electrode composition or anode mixture 28, 128 and electrolyte are put into anode casing 26, 126. In a button cell, the anode mixture insertion is a two step process wherein dry anode mixture materials are generally deposited (e.g., dispensed) first into the concave portion of the anode casing 26 followed by KOH solution dispensing. In a prismatic cell, the wet and dry components of the anode mixture are generally blended beforehand and then deposited in one step into the anode casing 126. Electrolyte can creep or wick along the inner surface 36, 136 of the anode casing 26, 126, carrying with it materials contained in anode mixture 28, 128 and/or the electrolyte.

The anode mixture 28, for a button cell comprises a mixture of zinc, electrolyte, and organic compounds. The anode mixture 28 preferably includes zinc powder, a binder such as SANFRESH™ DK-500 MPS, CARBOPOL® 940 or CARBOPOL® 934, and a gassing inhibitor such as indium hydroxide (In(OH)$_3$) in amounts of about 99.7 weight percent zinc, about 0.25 weight percent binder, and about 0.045 weight percent indium hydroxide. SANFRESH™ DK-500 MPS is a crosslinked sodium polyacrylate from Tomen America Inc. of New York, N.Y., USA, and CARBOPOL® 934 and CARBOPOL® 940 are acrylic acid polymers in the 100% acid form and are available from Noveon Inc. of Cleveland, Ohio, USA.

The electrolyte composition for a button cell is preferably a mixture of about 97 weight percent potassium hydroxide (KOH) solution where the potassium hydroxide solution is 28-40 weight percent, preferably 30-35 weight percent, and more preferably about 33 weight percent aqueous KOH solution, about 3.00 weight percent zinc oxide (ZnO), and a very small amount of Carbowax® 550, which is a polyethylene glycol based compound available from Dow Chemical Co. (Midland, Mich., USA), preferably in an amount of about 10 to 500 ppm, more preferably about 30 to 100 ppm, based on the weight of zinc composition in the anode.

The anode mixture 128, for a prismatic cell comprises a mixture of zinc, electrolyte, and organic compounds. The anode mixture 128 preferably includes zinc powder, electrolyte solution, a binder such as CARBOPOL® 940, and gassing inhibitor(s) such as indium hydroxide (In(OH)$_3$) and DISPERBYK® D190 in amounts of about 60 to about 80 weight percent zinc, about 20 to about 40 weight percent electrolyte solution, about 0.25 to about 0.50 weight percent binder, about 0.045 weight percent indium hydroxide and a small amount of Disperbyk® D190, preferably in an amount of about 10 to 500 ppm, more preferably about 100 ppm, based on the weight of zinc. DISPERBYK® D190 is an anionic polymer and is available from Byk Chemie of Wallingford, Conn., USA.

The electrolyte composition for a prismatic cell is preferably a mixture of about 97 weight percent potassium hydroxide (KOH) solution where the potassium hydroxide solution is about 28 to about 40 weight percent, preferably about 30 to about 35 weight percent, and more preferably about 33 weight percent aqueous KOH solution, and about 1.00 weight percent zinc oxide (ZnO).

Preferred zinc powders are low-gassing zinc compositions suitable for use in alkaline cells with no added mercury. Examples are disclosed in U.S. Pat. Nos. 6,602,629 (Guo et al.), 5,464,709 (Getz et al.) and 5,312,476 (Uemura et al.), which are hereby incorporated by reference.

One example of a low-gassing zinc is ZCA grade 1230 zinc powder from Zinc Corporation of America, Monaca, Pa., USA, which is a zinc alloy containing about 400 to about 550 parts per million (ppm) of lead. The zinc powder preferably contains a maximum of 1.5 (more preferably a maximum of 0.5) weight percent zinc oxide (ZnO). Furthermore, the zinc powder may have certain impurities. The impurities of chromium, iron, molybdenum, arsenic, antimony, and vanadium preferably total 25 ppm maximum based on the weight of zinc. Also, the impurities of chromium, iron, molybdenum, arsenic, antimony, vanadium, cadmium, copper, nickel, tin, and aluminum preferably total no more than 68 ppm of the zinc powder composition by weight. More preferably, the zinc powder contains no more than the following amounts of iron, cadmium, copper, tin, chromium, nickel, molybdenum, arsenic, vanadium, aluminum, and germanium, based on/the weight of zinc: Fe-3.5 ppm, Cd-8 ppm, Cu-8 ppm, Sn-5 ppm, Cr-3 ppm, Ni-6 ppm, Mo-0.25 ppm, As-0.1 ppm, Sb-0.25 ppm, V-2 ppm, Al-3 ppm, and Ge-0.06 ppm.

In a further embodiment, the zinc powder preferably is a zinc alloy composition containing bismuth, indium and aluminum. The zinc alloy preferably contains about 100 ppm of bismuth, 200 ppm of indium, and 100 ppm of aluminum. The zinc alloy preferably contains a low level of lead, such as about 35 ppm or less. In a preferred embodiment, the average particle size (D50) is about 90 to about 120 micrometers (μm). Examples of suitable zinc alloys include product grades NGBIA 100, NGBIA 115, and BIA available from N.V. Umicore, S.A., Brussels, Belgium.

Cell 10, 110 also includes a gasket 30, 130 made from an elastomeric material which serves as the seal. The bottom edge of the gasket 30, 130 has been formed to create an inwardly facing lip 32, 132, which abuts the rim of anode casing 26, 126. Optionally, a sealant may be applied to the sealing surface of the gasket, cathode casing and/or anode casing. Suitable sealant materials will be recognized by one skilled in the art. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene. A preferred sealant is SWIFT® 82996, described hereinabove.

The cathode casing 12, 112, including the inserted air electrode 20, 120 and associated membranes is inverted and pressed against the anode cup/gasket assembly, which is pre-assembled with the casing inverted so the rim of the casing faces upward. While inverted, the edge of the cathode casing 12, 112 is deformed inwardly, so the rim 34, 134 of the cathode casing 12, 112 is compressed against the elastomeric gasket 30, 130, which is between the cathode casing 12, 112 and the anode casing 26, 126, thereby forming a seal and an electrical barrier between the anode casing 26, 126 and the cathode casing 12, 112.

Any suitable method may be used to deform the edge of the casing inward to seal the cell, including crimping, colleting, swaging, redrawing, and combinations thereof as appropriate. Preferably a button cell is sealed by crimping or colleting with a segmented die so that the cell can be easily removed from the die while a better seal is produced. As used herein, a segmented die is a die whose forming surfaces comprise segments that may be spread apart to enlarge the opening into/from which the cell being closed is inserted and removed. Preferably portions of the segments are joined or held together so they are not free floating, in order to prevent individual segments from moving independently and either damaging the cell or interfering with its insertion or removal. Preferred crimping mechanisms and processes are disclosed in commonly owned U.S. Pat. No. 6,256,853, which is hereby incorporated by reference. Preferably a prismatic cell is sealed by crimping.

A suitable tab (not shown) can be placed over the opening 18, 118 until the cell 10, 110 is ready for use to keep air from entering the cell 10 before use.

Figures 4, 5:
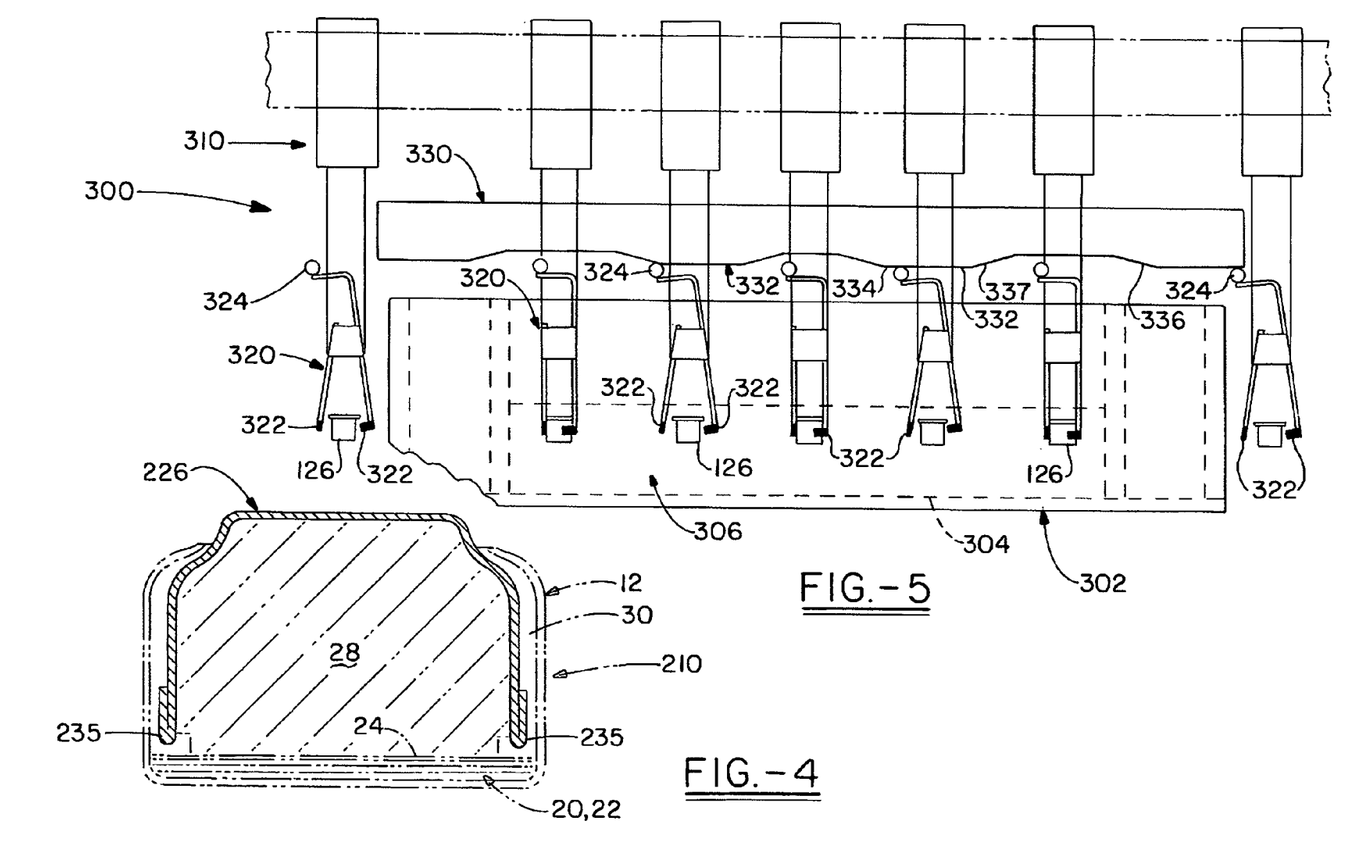
FIG. 4 is an elevational view, in cross-section, of a button-type air electrochemical cell employing a refold-type anode casing.
FIG. 5 is a schematic illustration of one embodiment of a variable contact rack plating device including a plating chamber for use in tin plating anode casings of the present invention.

In yet a further embodiment of the present invention, as illustrated in FIG. 4, a refold anode casing 226 is utilized in an electrochemical cell 210, instead of anode casing 26 that is typically referred to in the art as a straight-walled anode casing and has terminal end 35 that defines the opening in anode casing 26. While the refold anode casing 226 has been illustrated with respect to a button-type cell, it is to be understood that refold type anode casings can be used in prismatic or flat cell construction. The other cell components illustrated in FIG. 4 in broken (ghost) lines have been described hereinabove with respect to electrochemical cell 10, and are herein incorporated by reference. Refold anode casing 226 has a rounded rim 235 that is substantially U-shaped at the end that defines the opening in anode casing 226. Refold anode casing 226 is formed in one embodiment by folding a portion of the wall of the casing back upon itself so that the opening in the casing is defined by rim 235. Refold anode casing 226 can be formed of the materials, dimensions, and the like as described hereinabove with respect to anode casing 26. Accordingly, refold anode casing 226 is plated with a layer of tin on a surface thereof. In one embodiment, the inner surface of refold anode casing 226 and rim 235 are plated with a layer of tin, and in a preferred embodiment, the entire surface, including both the inner surface and outer surface, of the refold anode casing 226 is tin plated.

As described hereinabove, the anode casing 26, 126, 226 is plated with a tin layer of tin or tin alloy and optionally a metal strike or other intermediate layer, or combinations thereof. As used herein, an intermediate layer is an underlayer of metal between the tin or tin alloy surface layer and the metal substrate. The underlayer can be electroplated as a strike or thicker layer, or the underlayer can be a clad layer of metal with a high hydrogen overvoltage, such as copper or a copper alloy. A strike layer is an electroplated layer up to about 2.5 μm thick, preferably averaging from 0.2 to 2.0 μm thick, more preferably averaging about 0.5 to 1.0 μm thick. Thicker electroplated underlayers are generally about 8 μm or greater in thickness. In general, an intermediate layer is preferred when the average thickness of the tin layer is less than 5 μm thick.

Preferably, a surface of the anode casing 26, 126, 226 is plated after the anode cup material, such as a steel, nickel plated steel, or clad metal material, has been formed into an anode casing 26, 126, 226 having a desired shape or form. In an embodiment, the plating of anode casings 26, 126, 226 is performed using a variable contact rack plating process. As used herein, a rack plating process is a plating process in which there is no part-to-part contact between individual anode casings during plating. An example of a variable contact rack plating device is set forth in U.S. Pat. No. 6,521,103, herein fully incorporated by reference. A preferred variable contact rack plating device is commercially available from Surface Finishing Technologies of Clearwater, Fla., USA.

The variable contact rack plating device includes a part holding assembly, such as a clamp assembly (as described in the embodiments below), including multiple holding elements that each selectively variably contact, and thus engage and disengage a portion of the anode casing during at least a tin plating process in order to produce a tin-plated anode casing wherein, in a preferred embodiment, the entire surface of the anode casing is tin-plated and is substantially without faults or uncoated areas on the surface of the anode casing. More specifically, the clamp assembly can include pairs of clips that variably or alternately contact and thus hold the anode casing, wherein the plating or other solution can alternately contact the anode casing in the area where one of the pairs of clips is disengaged from the casing. The variable contact rack plating device includes a transport assembly that can move the anode casing through the plating bath at a tin plating station, and preferably one or more additional stations, most preferably a plurality of stations, such as, but not limited to, one or more cleaning stations, one or more rinsing stations, one or more metal strike stations, one or more other plating stations, and a drying station. The variable contact between the holding elements of the clamp assembly and the anode casing is performed at one or more stations of the device, preferably while the anode casing is immersed in a bath, such as a cleaning bath, strike bath, rinsing bath, plating bath, or at a drying station. During electroplating portions of the process, current can flow through the anode casing being plated through the clamp assembly. The plating process can be performed in a clean environment to minimize the risk of contamination of the plated parts.

Anode casings of the present invention can be processed continuously in the variable contact rack plating device, using single piece flow through various stations of the device, wherein individual casings are processed separately and continuously, producing high quality tin-plated casings. The variable contact rack plating device allows plated anode casings to be produced efficiently at relatively high speeds, as compared to rack plating with fixed holding elements.

An example of one embodiment schematically illustrating a portion of a variable contact rack plating device 300 is shown in FIG. 5. Device 300 includes a plating chamber 302 including a tank 304 having a plating solution or bath 306 therein. Plating solutions are described hereinbelow. Anode casing transport assembly 310 is configured to move a desired anode casing, such as 126 shown, through the plating chamber 302 and plating solution 306 to plate the casing, as well as through any other desired stations present in the device.

A clamp assembly 320 is operatively connected to the transport assembly 310 for variably contacting and holding the anode casing 126 to uniformly plate the anode casing with a tin layer and substantially leave no unplated areas or other imperfections at the connection locations between the anode casing and clamp assembly 320. The clamp assembly includes a plurality of holding elements such as clips 322, preferably multiple sets of clips 322 that can be considered fingers or prongs, movable between a first position in engagement with an anode casing and at least a second position disengaged from the anode casing. The variable contact allows the entire anode casing to be plated in plating solution 306.

At the plating station, the anode casing 126 to be plated is held in the clamp assembly 320 by at least a first clip 322 and a second clip 322, and preferably at least a first and second set of clips 322. As the plating clamp assembly 320 travels or moves through the plating chamber 302, the first clip or set of clips and a second clip or second set of clips each sequentially and alternately move in and out of contact or engagement with the anode casing at least while in plating solution 306, whereby the anode casing is plated on the entire surface thereof. In a preferred embodiment, the variable contact rack plating device 300 includes an actuating mechanism 330 having at least one and preferably a plurality of actuators 332 that selectively move the clips 322 of the clamp mechanism from an engaged to a disengaged position with respect to the anode casing. In one embodiment, the actuator includes a horizontal surface 334 having a first transition surface 336 and a second transition surface 337, wherein a cam follower 324 of the clamp assembly engages and moves or travels therealong, and generally follows the path thereof to produce a selective engagement between the respective clip 322 or set of clips and the anode casing.

In a preferred embodiment, the clamp assembly 320 is electrically connected to a suitable power source and control panel thereby making the anode casing receptive to metal ions present in the plating solution 306, and is thus electroplated with a tin layer as the anode casing is moved through the plating solution 306.

A predetermined volume and concentration of a plating solution containing tin is utilized in plating tank 304. The amount of plating solution is dependent upon factors such as the dimensions of the plating tank 304, as well as the volume of parts to be plated. In a preferred embodiment, a plating solution comprising tin concentrate, an acid, an antioxidant, a wetting agent, a brightening agent, a makeup agent and water are utilized in plating tank 304. The amount of plating solution 306 and components thereof can be adjusted to achieve desired plating characteristics on an anode casing. Plating chamber 302 preferably includes a chiller in order to maintain the plating solution composition within a predetermined temperature range, as described hereinbelow. In a preferred embodiment, the plating solution comprises components available from Technic, Inc. of Cranston, R.I., USA under the designation TECHNISTAN™ JB 3000, which provides the anode casing with a bright tin layer with desirable properties. It has been found that anode casings can be produced having desirable properties such as a tin surface that is resistant to tarnishing and a substantially uniform plating density, wherein the casings can be used in forming electrochemical cells having relatively high limiting current values. TECHNISTAN™ JB 3000 plating solution contains: TECHNISTAN™ acid, TECHNISTAN™ tin concentrate, TECHNISTAN™ JB 3000 makeup, TECHNISTAN™ JB 3000 brightener, TECHNISTAN™ antioxidant, and deionized water.

The plating chamber 302 including tank 304 is configured such that a desired level or volume of plating solution 306 sufficient to perform the plating step on an anode casing, and preferably a plurality of anode casings in succession, is contained therein. Tank 304 is preferably made from a polymer, such as polypropylene or polyethylene, that is resistant and non-reactive with the components of the plating solution 306. An anode basket, preferably titanium, is situated within the tank 304 and contains tin such as in the form of pellets, slugs, balls or other particles that enter the plating solution as ions to replace tin that is plated on the surface of the anode casings and thus removed from the plating solution. The anode basket is conductive and stable in the plating solution. Tank 304 can include one or more lines, pumps, filters and valves to provide a desired process loop. In one embodiment, the tank can include a filtration loop, wherein filtration is used to capture possible contaminants, preferably continuous filtration, can be performed such as using 10 micrometer woven polypropylene filter cartridges. The plating solution can be recirculated through the filtration loop at a flow rate of from about 3 to about 5 times plating solution volume per hour. The plating chamber 302 includes a control panel operatively connected thereto in order to perform the electrolytic tin-plating of the anode casings within the plating chamber.

The plating solution preferably comprises tin, such as present in TECHNISTAN™ tin concentrate from Technic, Inc. The tin concentrate is present in an amount generally about 163 to about 165 milliliters per liter and preferably 164 milliliters per liter of plating solution.

The plating solution also can include, but is not limited to, various components such as acids, makeup agents, brightening agents, antioxidants, wetting agent water, or the like.

In a preferred embodiment, an acid, preferably TECHNISTAN™ acid from Technic, Inc. is utilized in an amount generally about 97 to about 103 milliliters per liter and preferably 100 milliliters per liter of plating solution.

An example of a preferred antioxidant is TECHNISTAN™ antioxidant available from Technic, Inc. The amount of antioxidant preferably is about 20 milliliters per liter of plating solution.

The preferred makeup agent, which is believed to include a wetting agent, is TECHNISTAN™ JB 3000 available from Technic, Inc. In a preferred embodiment, the makeup agent is present in an amount generally from about 39 to about 41 milliliters per liter and preferably 40 milliliters per liter of plating solution.

An example of a preferred brightening agent is TECHNISTAN™ JB 3000 brightener available from Technic Inc. The brightening agent is present in an amount generally from about 9 to about 11 milliliters per liter and preferably about 10 milliliters per liter of plating solution.

In a preferred embodiment, the balance of the plating composition is water, preferably deionized water.

The thickness of the tin plating on anode casings 26, 126, 226 depends upon a number of factors including the current applied, current density, plating time or dwell time, and metals content of the plating bath. In one embodiment, plating time or dwell time in the plating solution ranges from about 45 seconds to about 180 seconds and preferably from about 45 seconds to about 120 seconds. Cathode current density can be from about 538 to about 2691 amps per square meter (50 to 250 amps per square foot) and preferably ranges from about 807 to about 2153 amps per square meter (75 to 200 amps per square foot) and preferably from about 1023 to about 1130 amps per square meter (95 to 105 amps per square foot). The temperature of the plating composition is preferably from about 22° C. (72° F.) to about 25.6° C. (78° F.).

In a preferred embodiment, tin is plated on a surface of anode cup 26 to an average thickness generally from about 1 to about 10 micrometers, as measured by X-ray fluorescence (XRF). Preferably the average thickness is no more than about 9 micrometers, more preferably no more than about 8 micrometers, and most preferably no more than about 7 micrometers. In some embodiments the average thickness of the tin is at least 2.5 micrometers to better protect against gassing due to imperfections in the tin plating.

The method for tin plating the anode casings preferably includes one or more preplating steps performed before the tin plating step, and one or more postplating steps performed after the anode casings have been tin-plated.

In a preferred embodiment, the anode casings are loaded on the clamp assembly 320, more specifically in clips 322, either manually or automatically, and processed in the variable contact rack plating device by subjecting the casings to an alkaline cleaning process, after which the anode casings are rinsed, preferably with water, most preferably deionized water. The anode casings are then subjected to an electrolytic cleaning step preferably cathodic, followed by a further rinsing step. In a further step, the anode casings are provided a metal strike layer utilizing an electrolytic immersion station of the variable contact rack plating device. In a further optional process step, the anode casings can be provided with a layer of copper plating. A further rinsing step is preferably performed. The anode casings are then subjected to an acid cleaning or etching step followed by a further rinsing step. Subsequently, the anode casings are tin-plated, rinsed again, and subsequently dried. The processing rate for the anode casings in the variable contact rack plating device is preferably about 30.48 centimeters per second (12 inches per second).

The alkaline cleaning step is utilized to remove residue, if present, on the surface of the anode casings. Accordingly, in one embodiment, the alkaline cleaning step is not performed, generally when the anode casings are relatively clean. The anode casings can be cleaned by immersing the anode casings in a tank containing alkaline cleaning solution, preferably with variable contact between the clamp assembly and the anode casing to facilitate cleaning of the entire surface of the anode casing. In a preferred embodiment, TEC™ 1001 from Technic Inc. is utilized as a cleaning agent. The TEC™ 1001 is mixed with water, preferably deionized water, in an amount generally from about 46 to about 78 milliliters per liter (6 to about 10 ounces per gallon), and preferably about 62.5 milliliters per liter (about 8 ounces per gallon) of water to form a cleaning solution. The temperature of alkaline cleaning solution is preferably from about 57° C. (135° F.) to about 63° C. (145° F.). The dwell time of the anode casings in the alkaline cleaning solution is preferably about 1 minute.

After the alkaline cleaning step, the anode casing can be transported to a rinsing station by the transport assembly and immersed in a tank containing a rinsing solution. Water, preferably deionized water, is utilized to rinse the anode casing to remove any remaining alkaline cleaning solution to prevent carryover into the next step in the plating process. The dwell time of the anode casing in the rinse tank preferably is about 0.25 minute. The rinse tank is preferably a counter flow tank wherein the tank contains two or more separate chambers with water from an upstream tank overflowing into a downstream tank.

The anode casing can be transferred by the transport assembly to an electrolytic cleaning station where it is electrolytically cleaned in a cleaning solution such as described hereinabove with respect to the alkaline cleaning station, such as TEC™ 1001. The anode casing is electrolytically cleaned by immersing the anode casing in a tank containing alkaline cleaning solution. In a preferred embodiment, the TEC™ 1001 is mixed with water, preferably deionized water, in an amount preferably from about 46 to about 62.5 milliliters per liter (6 to about 8 ounces per gallon) of water to form a cleaning solution. The temperature of the alkaline cleaning solution is preferably from about 57° C. (135° F.) to about 63° C. (145° F.). The electrolytic cleaning step tank is desirably metal, preferably steel, most preferably 400 stainless steel. The electrolytic cleaning is preferably cathodic with a voltage ranging from about 6 to about 9 volts. The dwell time of the anode casing within the electrolytically cleaning tank is preferably about 1 minute.

After the electrolytic cleaning step, the anode casing can be transported to a rinsing station and rinsed, such as by using the counter flow system as described hereinabove, utilizing water, preferably deionized water. Dwell time is preferably about 0.25 minute.

Rinsed anode casings are transferred to a metal strike station, wherein the anode casing is immersed in a metal strike plating solution in a metal striking tank. The strike is a metal preferably having a relatively high hydrogen overpotential and can include non-alloyed metals or metal alloys including, but not limited to metals such as, copper, indium, lead, mercury, bronze, and MIRALLOY™ (an alloy of copper, tin and zinc available from Umicore Galvanotechnik GmbH, Schwabisch Gmünd, Germany). Copper or bronze strikes are preferred. It is believed that the metal strike provides better adhesion of the tin plating layer to the anode casing and also provides a relatively high hydrogen overpotential metal beneath the tin layer as added protection in any place where the tin layer is not continuous or is subsequently damaged. The thickness of the strike layer preferably is up to about 1 micrometer. If the anode casing already has an inside surface layer including one of the above listed strike metals, such as copper, the strike step does not have to be performed.

The composition of the metal strike plating solution will vary depending upon the particular material utilized for the strike. For example, in one embodiment a strike plating solution includes copper cyanide in a range from about 23 to about 31 milliliters per liter (3 to about 4 ounces per gallon), and preferably about 27 milliliters per liter (3.5 ounces per gallon); potassium in an amount generally from about 11.7 to about 23 milliliters per liter (1.5 to 3 ounces per gallon), and preferably about 15.5 milliliters per liter (2 ounces per gallon); potassium hydroxide in an amount generally from about 4 to about 15.5 milliliters per liter (0.5 to 2 ounces per gallon), and preferably about 15.5 milliliters per liter (2 ounces per gallon); Rochelle salts in an amount preferably about 19.5 milliliters per liter (2.5 ounces per gallon).

Cathode current density for the metal strike step ranges generally from about 431 to about 646 amps per square meter (40 to 60 amps per square foot) and preferably from about 538 amps per square meter (50 amps per square foot). The plating composition is preferably from about 21° C. (70° F.) to about 26.7° C. (80° F.).

The metal striking tank is preferably made from a polymer, such as polypropylene or polyethylene, that is resistant to and non-reactive with the components of the plating solution 306. An anode basket, preferably titanium, is situated within the tank and contains copper such as in the form of pellets, slugs, balls or other particles that enter the plating solution as ions to replace copper that is plated on the surface of the anode casings and thus removed from the plating solution. The anode basket is conductive and stable in the strike plating solution. The metal strike tank can include one or more lines, pumps, filters and valves to provide a desired process loop. In one embodiment, the tank includes a filtration loop, such as described hereinabove. The metal strike plating station includes a control panel operatively connected thereto in order to apply a desired metal strike layer to the anode casing. Steel or stainless steel is preferably utilized as an insoluble anode in the strike station. Dwell time of the anode casing in the metal strike solution is preferably about 15 seconds.

As an alternative or in addition to a copper strike, in an optional step, the anode casing can be provided with copper plated layer at a plating station prior to tin plating. The anode casing is transferred from the metal strike station to the copper plating station via the transport assembly and additionally plated with a copper layer during a dwell time in the plating solution of preferably about 1.45 minutes.

The plating station includes a tank configured such that a desired level or volume of plating solution sufficient to perform the plating step on the anode casing is contained therein. The tank is preferably a polymer tank such as polypropylene or polyethylene, resistant to and non-reactive with the components of the plating solution. An anode basket, preferably stainless steel, is situated within the tank and contains copper such as in the form of pellets, slugs, balls or other particles that enter the plating solution as ions to replace copper that is plated on the surface of the anode casing and thus removed from the plating solution. The anode basket is conductive and stable in the plating solution. The plating station can include one or more lines, pumps, filters and valves to provide a desired process loop. In one embodiment, the tank can include a filtration loop such as described hereinabove. The plating solution can be recirculated through the filtration loop at a flow rate of from about 3 to about 5 times plating solution volume per hour. The plating station includes a control panel operatively connected thereto in order to apply a desired plated layer to the anode casing. The temperature of the plating composition is preferably from about 46° C. (115° F.) to about 51.7° C. (125° F.).

The composition of the copper plating solution generally includes copper cyanide in a range from about 46.8 to about 78 milliliters per liter (6 to about 10 ounces per gallon), and preferably about 62.5 milliliters per liter (8 ounces per gallon); potassium cyanide in an amount generally from about 78 to about 141 milliliters per liter (10 to 18 ounces per gallon), and preferably about 125 milliliters per liter (16 ounces per gallon); free cyanide in an amount generally from about 78 to about 23.4 milliliters per liter (1 to 3 ounces per gallon), and preferably about 15.6 milliliters per liter (2 ounces per gallon); potassium hydroxide in an amount generally from about 23.4 to about 39 milliliters per liter (3 to 5 ounces per gallon), and preferably about 31.2 milliliters per liter (4 ounces per gallon); Rochelle salts in an amount generally from about 23.4 to about 39 milliliters per liter (3 to 5 ounces per gallon), and preferably about 31.2 milliliters per liter (4 ounces per gallon). Cathode current density ranges generally from about 323 to about 861 amps per square meter (30 to 80 amps per square foot) and preferably about 431 to about 861 amps per square meter (40 to 80 amps per square foot).

The anode casing subsequently is transported to a rinsing station and rinsed such as using the counter flow system as described hereinabove, utilizing water, preferably deionized water. Dwell time is preferably about 0.25 minute.

The rinsed anode casing is transferred to an activation station wherein the anode casing is immersed in an activation solution within a tank. The anode casing activation preferably utilizes an acid solution, containing an acid such as sulfuric acid. Other acids can be used. Preferably the acid is one that generates little gas and will not attack the anode casing during activation. The acid is present in an amount generally from about 6 to 14 weight percent, desirably about 8 to 12 weight percent, and preferably about 10 weight percent based on the total weight of the solution. The activation step activates the surface of the anode casing for plating. The dwell time of the anode casing in the solution is preferably for about 0.25 minute.

Subsequent to activation, the anode casing is preferably transported to and rinsed at a further rinsing station such as using the counter flow system as described hereinabove, utilizing water, preferably deionized water, in order to reduce carryover of activation solution into the tin plating station.

After the rinse step, the tin plating process step is performed as described hereinabove utilizing plating chamber 302.

In a further step, the anode casing is subjected to one or more subsequent rinses such as using the counter flow system as described hereinabove, utilizing water, preferably deionized water. The purpose of the rinse is to remove any remaining tin plating solution on the anode casing. In one embodiment, the rinsing step includes spraying water, preferably deionized water, onto the anode casing.

In a further step, the plated anode casing is dried utilizing forced air at a drying station. Any suitable drying process can be used. At a drying station according to one embodiment, heated air (e.g., from about 65.56° C. (150° F.) to about 104.44° C. (220° F.) is directed at the anode casing. The anode casing generally remains at the drying station until dry, preferably for about 30 seconds.

After the anode casing is dried, the same is removed from the one or more clips 322 of clamp assembly 320 and incorporated into an electrochemical cell as described hereinabove. After the anode casing has been removed from the one or more clips 322 of the clamp assembly 320, the clips and/or clamp assembly are preferably electrolytically or immersion cleaned to remove any build-up of plating solution thereon utilizing an appropriate stripping solution.

EXAMPLE 1

A number of plating processes were evaluated to identify those that might be suitable for plating prismatic cell anode casings. The anode casings were similar in shape to that shown in FIG. 1. They were made from steel strip, plated with nickel on both sides, and the outside dimensions of the formed casings were approximately 44.6×25.6×3.1 mm (length×width×height). The plating processes evaluated were:

1. Barrel—plating done inside of a perforated barrel, with rotation of the barrel to provide agitation of the parts and even plating.
2. Barrel with wrist action—a type of barrel plating in which the barrel is also moved in other, non-rotational motions in order to modify the agitation of the parts in the barrel.
3. Oscillating barrel—a type of barrel plating in which a cylindrical barrel is rotated about an axis that is offset from the longitudinal axis of symmetry such that the barrel is tilted from one side to the other as it rotates (e.g., Oscillating Plating Barrel from Harwood Line Manufacturing Company, Chicago, Ill., USA).
4. Tumble—one or a series of baskets, each equipped with a rotating belt to agitate the parts within the basket and transfer the parts to the next station when the basket is tipped (e.g., Technic, Inc. TUMBLEPLATER® process).
5. Rotary flow through—a process in which parts in a vertical rotating dome are intermittently centrifugally compacted against a cathode ring at the perimeter of the dome (e.g., as described in U.S. Pat. Nos. 5,487,824 and 5,565,079).
6. Spouted bed electrode—a process in which the parts and fluid (e.g., plating solution) are agitated by directing a central stream of parts and fluid upward, after which the parts and fluid fall and are directed outward (e.g., as described in U.S. Pat. No. 6,193,858).
7. Rack—objects are clipped to a rack and then put into the electrolyte solution.
8. Rack with variable contact—rack plating with alternating clamp fingers (e.g., as described above and in U.S. Pat. No. 6,521,103).

Each of the processes was observed to determine which would operate with the anode casings with proper movement of the casings. For those that would operate, the anode casings were plated with tin and examined for plating appearance.

The results of the evaluations are summarized in Table 1. Tumble plating and spouted bed electrode plating were unsuitable from a processing standpoint, and only rack plating with variable contact produced plated casings that were not unacceptable due to poor appearance, damaged parts or visible plating defects.

The chemistries listed in Table 1 include all components of the plating solution (e.g., tin concentrate, acid solution, makeup, brightener, antioxidant, and water). Components of the plating solutions used were:

(a) ROPLATE® Sn: Stannous sulfate solution, sulfuric acid solution (C.P. Grade, SG-1.84), ROPLATE® Sn Make Up #1-B solution, ROPLATE® Make Up #2 solution, and ROPLATE® Sn Maintenance A solution;

(b) TECHNISTAN BT1™: TECHNISTAN™ Tin $SnSO_4$ solution, TECHNI BT™ Wetter 1 solution, TECHNI BT™ Brightener 2 solution, and NF ANTIOXIDANT™ #1 solution;

(c) TECHNISTAN BT2™: TECHNISTAN™ Tin $SnSO_4$ solution, TECHNI BT™ Wetter 2 solution, TECHNI BT™ Brightener 2 solution, and NF ANTIOXIDANT™ #1 solution; and (d) TECHNISTAN™ JB 3000: TECHNISTAN™ Acid solution, TECHNISTAN™ Tin Concentrate solution, TECHNISTAN™ JB 3000 Makeup solution, TECHNISTAN™ Brightener solution, TECHNISTAN™ Antioxidant solution, and deionized water.

TABLE 1

| Plating Process and Chemistry | Processing | Plating Appearance Quality |
|---|---|---|
| Barrel, Atotech ROPLATE ® Sn | suitable | scratches through plating |
| Barrel with wrist action, Technic TECHNISTAN ™ BT2 | suitable | hazy appearance, warped casings, deep scratches |
| Oscillating Barrel, Technic TECHNISTAN ™ BT2 | marginal | hazy appearance, scratches |
| Tumble, none (water only to evaluate processing) | casings float on plating solution, stick to equipment surfaces and nest together | not evaluated |
| Rotary flow through, Atotech ROPLATE ® Sn and Technic TECHNISTAN ™ BT1 | marginal | hazy appearance, scratches and pin holes |
| Spouted bed electrode, none (water only to evaluate processing) | could not maintain fountain, even with fluidizing media added | not evaluated |
| Rack, Atotech ROPLATE ® Sn and Technic TECHNISTAN ™ BT1 | suitable | unacceptable - insufficient plating at clamp contact points, pin holes, bent parts |
| Rack with variable contact, Technic TECHNISTAN ™ JB 3000 | suitable | acceptable |

EXAMPLE 2

Rack plating with variable contact was evaluated with a number of tin plating chemistries, all available from Technic, Inc. (see Table 2). All were plated to about 100 Amp-minutes at the current density shown in Table 2; where a current density range is listed, at least the low and high limits of the range were evaluated.

The TECHNISOLDER™ chemistries contained lead, while the TECHNISTAN™, ROPLATE® and CERAMISTAN™ chemistries did not. The TECHNISTAN™ JB 3000 chemistry used differed slightly in the ratio of components from the standard JB 3000 chemistry. The JB 3000 chemistry contained TECHNISTAN™ Acid solution (100 ml per liter), TECHNISTAN™ Tin Concentrate solution (164 ml per liter), TECHNISTAN™ JB 3000 Makeup solution (40 ml per liter), TECHNISTAN™ JB 3000 Brightener solution (10 ml per liter), TECHNISTAN™ Antioxidant solution (20 ml per liter), and deionized water (balance).

The plated casings were evaluated for initial finish brightness. Both the TECHNISTAN™ BT2 and TECHNISTAN™ JB 3000 chemistries produced a bright finish, while the others produced a matte finish; however, it was not possible to plate without a severely stained finish at high current densities with the TECHNISTAN™ BT2 chemistry, which is intended for use at low current densities.

Samples of plated anode casings were subjected to a gassing test, in which a small amount of zinc powder was placed on a plated portion of the plated casing, the zinc powder was pushed into a small area to leave a relatively large observation area free of the zinc powder, sufficient 33 weight percent KOH electrolyte solution was added to cover the zinc powder and adjacent observation area, and the observation area was examined for gas bubbles using a microscope at a magnification of 20 to 40 times until the observation area is plated over with zinc (generally an hour or longer). Bubbles present initially, which may have been due to entrapped air, were removed from the surface of the observation area, and only bubbles that appeared thereafter were attributed to gassing). Bubble formation was considered to indicate gassing. Bubble formation only at surface defects (e.g., pin holes and scratches) was considered to indicate defects extending through the tin plating to the nickel plated stainless steel substrate. A large number of bubbles extending over an area free of visible defects was considered to indicate inadequate tin plating. The results of the gassing test (qualitative descriptions of the number of bubbles formed) are summarized in Table 2. The best results were seen with the TECHNISTAN™ JB 3000 chemistry.

Casings plated with the TECHNISTAN™ BT2 and TECHNISTAN™ JB 3000 chemistries were also evaluated for tarnishing by storing at 60° C. and 50 percent relative humidity. Casings plated with the JB 3000 chemistry were much more resistant to tarnishing.

Overall, only the combination of rack plating with variable contact and bright plating provided suitable processing, acceptable plating appearance quality, gassing resistance, and tarnishing resistance. The casings plated with TECHNISTAN™ JB 3000 at current densities between about 807 and about 2153 amps per square meter (between 75 and 200 amps per square foot) had a brighter finish than casings plated with TECHNISTAN™ JB 3000 at lower current densities and casings plated with any of the other chemistries. Casings plated with TECHNISTAN™ BT2 were next in brightness, followed by casings plated with ROPLATE® Sn.

TABLE 2

| Chemistry | Current Density | Finish | Gassing | Tarnishing |
|---|---|---|---|---|
| TECHNISOLDER ™ High Speed | 538-2153 A/m$^2$ (50-200 A/ft$^2$) | matte | many bubbles | not tested |
| TECHNISOLDER ™ 900 | 1076 A/m$^2$ (100 A/ft$^2$) | matte | many bubbles | not tested |
| TECHNISOLDER ™ NF 200 | 1076 A/m$^2$ (100 A/ft$^2$) | matte | few bubbles | not tested |
| CERAMISTAN ™ DM | 1076 A/m$^2$ (100 A/ft$^2$) | matte | many bubbles | not tested |
| ROPLATE ® Sn | 43-183 A/m$^2$ (4-17 A/ft$^2$) | bright | some bubbles | not tested |
| TECHNISTAN ™ BT2 | 1076 A/m$^2$ (100 A/ft$^2$) | bright | few bubbles | tarnishing after 1-2 days |
| TECHNISTAN ™ BT2 | 807-2153 A/m$^2$ (75-200 A/ft$^2$) | bright | few bubbles | tarnishing after 1-2 days |
| TECHNISTAN ™ JB 3000 | 807-2153 A/m$^2$ (75-200 A/ft$^2$) | bright | no bubbles | no tarnishing after 5 months |
| TECHNISTAN ™ JB 3000 | 22-538 A/m$^2$ (2-50 A/ft$^2$) | bright (stained) | many bubbles | not tested |

Sample casings, plated with TECHNISTAN™ JB 3000 at 807-2153 A/m$^2$ (75-200 A/ft$^2$) and with TECHNISTAN™ BT2, were tested for total reflectance using a sphere spectrophotometer in the Reflectance Specular Excluded (RSEX) mode. The Y parameter values on the CIE (Commission on Illumination) 1931 color space were 6.38 for the JB 3000 and 48.41 for the BT2 chemistry, respectively, on a scale where 0 represents the maximum reflectance and 100 represents no reflectance.

EXAMPLE 3

Rack plating with variable contact was evaluated further using TECHNISTAN™ JB 3000 chemistry (with components in the ratios described in Example 2), both with and without intermediate plating steps, to provide a bright pure (non-alloyed) tin deposit.

Anode casings were of the same dimensions as those in Example 1 and were made either from steel strip, steel strip plated on both sides with nickel, or nickel-stainless steel-copper triclad strip with the copper layer on the inside of the casing. Casings made from triclad strip were acid etched with 10-15 volume percent industrial grade sulfuric acid solution prior to tin plating to remove oxides and activate the copper surface.

The plating current density was about 1076 amps per square meter (100 amps per square foot) and the tin plating time was about 2 to 2.75 minutes, except where otherwise noted below. Intermediate platings (strikes and underplatings) with relatively high hydrogen overvoltage metals (compared to the substrate material) were evaluated to determine if improvements could be made in the adhesion of the tin layer or protection against gassing when the tin plating layer was thin, defective or damaged. The intermediate plating steps included in the evaluation were copper plating and strikes with cyanide copper, acid copper, alkaline copper, cyanide bronze and lead-free cyanide bronze.

Samples of the anode casings were tested for gassing using the gassing test described in Example 2. The results, summarized in Table 3, show that the amount of gassing was unacceptably high (many bubbles) for all casings that were not plated with tin using the JB 3000 plating chemistry and that it was necessary to have a copper-containing layer present under the tin plating, either as the surface of the substrate on the inside of the formed casings or as an intermediate layer deposited prior to plating tin onto the casings for the tin plating time (plating thickness) used. These results also show that it is desirable to minimize contaminants in the strike and plating solutions, particularly metals such as lead that have higher hydrogen overvoltages than that of copper.

TABLE 3

| | | Casing Substrate | | |
| --- | --- | --- | --- | --- |
| Sn Plating Chemistry | Intermediate Plating | Steel | Ni-Plated Steel | Ni-SS-Cu Triclad |
| none | no strike | many | many | many |
| none | CN Cu strike | many | some to many | |
| none | CN bronze strike | many | many | |
| none | CN bronze strike (Pb-free) | many | some to many | |
| JB 3000 | no strike | many | many | none to few |
| JB 3000 | acid Cu strike | | few to many | |
| JB 3000 | alk. Cu strike | | some | |
| JB 3000 | CN Cu strike | | none | |
| JB 3000 | CN Cu strike/ Cu plate | | none to few | |
| JB 3000 | CN bronze strike | | few to many | |
| JB 3000 | CN bronze strike (Pb-free) | | none | |
| JB 3000 | Ni strike | | many | |

EXAMPLE 4

Prismatic cells like the cell shown in FIG. 1 were made using those types of anode casings that produced no more than a few bubbles on the gassing test in Example 2. The cell anode was a mixture of about 75 weight percent low gassing zinc powder, about 24.5 weight percent electrolyte solution (containing 33 weight percent KOH and 1 weight percent ZnO), about 0.35 weight percent CARBOPOL® 940 binder, about 0.03 weight percent $In(OH)_3$, about 0.02 weight percent DISPERBYK® 190, and about 0.1 weight percent additional water. The initial void volume within the negative electrode chamber (on the negative electrode side of the separator) was about 0.55 $cm^3$, or about 16.8 percent.

Sample cells were tested to evaluate the effects of internal gassing using a sealed cell OCV test. The air holes in the cathode casings were sealed with epoxy so that essentially no oxygen could enter and the only oxygen available was that which was in the cell at the time it was sealed. The open circuit voltages of the cells were measured after storing for 2 weeks at 45° C., giving a quantitative indication of the amount of hydrogen gas generated in the cells after sealing, since the hydrogen reacts with and consumes a portion of the oxygen present in the sealed cells and reduces the open circuit voltages proportionally.

The average sealed cell OCV's are summarized in Table 4. Where more than one lot was tested, an average is shown for each lot tested. The average OCV's were all at least 0.762. In general it has been found that an average OCV of at least 0.9 volt on this test is desirable, and preferably the average OCV is at least 0.95 volt. The higher the OCV the better, though the maximum is usually about 1.0 volt because of the limited amount of oxygen present in the sealed cell.

TABLE 4

| | Casing Substrate | |
| --- | --- | --- |
| Intermediate Plating | Ni-Plated Steel | Ni-SS-Cu Triclad |
| no strike | | 0.762 |
| Cu strike | 0.762, 0.809, 0.811, 0.972 | |
| Cu strike/Cu plate | 0.871 | |
| bronze strike | 0.879, 0.883 | |
| (Pb-free) | (1076 A/$m^2$, 1 min.) | |

Cells with anode casings made from nickel-stainless steel-copper triclad and cells with anode casings made from nickel plated steel and plated with a copper strike followed by tin using rack plating with variable contact and JB 3000 chemistry were also tested for limiting current at 1 volt following storage for 17 days at 60° C. The average limiting current for cells with the unplated triclad casings was 273 mA, while the average limiting current for cells with the post-plated nickel plated steel casings was 296 mA.

Plating at 1076 A/$m^2$ (100 A/$ft^2$) for 2 minutes was determined to be satisfactory. Increasing the plating current density and/or time will provide a thicker layer of tin and more protection against internal gassing. Under these conditions the thickness of the plated tin layer was found to be about 4.6 to 4.8 µm on the inside surface and about 6.8 to 7.9 µm on the outside of the casing, as determined by scanning electron microscope cross section (ASTM B487). In general, a mean tin thickness of about 8 µm is desirable on the exterior surface of the anode casing for good corrosion protection. The minimum mean tin thickness on the interior surface of the anode casing is the minimum required to achieve a continuous tin layer, and the maximum mean tin thickness will be determined by the maximum anode casing dimensions that can be tolerated from a parts fit standpoint. In general, about 2 µm has been found to provide a continuous layer of tin on the interior surface, and a layer of up to about 10 µm can be tolerated without fit problems. The mean tin thickness on the recessed portion of the interior of the anode casing will preferably be 4 to 7 µm.

In general, it was found that current densities ranging from about 807 to about 2153 A/m2 and plating times from about 0.75 to about 3 minutes produced satisfactory plated tin layers on anode casings plated in a rack plating process with variable contact using a JB 3000 bright tin chemistry. Various combinations of current densities and plating times can produce acceptable plated anode casings (e.g., to provide similar Amp-minutes of plating), there is little additional advantage to increasing the amount of plating to more than about 10 µm.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A method of manufacturing an electrochemical cell comprising the steps:
   (a) providing a sheet comprising a steel layer as a substrate;
   (b) forming a negative electrode casing from the substrate;
   (c) electroplating a layer comprising bright tin and having an average thickness from 1 to 10 micrometers onto the substrate, using a rack plating process with variable contact holding of the negative electrode casing and an electroplating current density from 538 to 2691 amps per square meter;
   (d) depositing a negative electrode material comprising zinc and an aqueous alkaline electrolyte in a concave portion of the negative electrode casing such that the negative electrode material is in contact with the tin layer on the negative electrode casing; and
   (e) combining the negative electrode casing and the negative electrode material with a positive electrode and a positive electrode casing to form a sealed cell.

2. The method as defined in claim 1, wherein the tin layer is electroplated using a current density from 807 to 2153 amps per square meter.

3. The method as defined in claim 1, wherein the average thickness of the tin layer is from 2.5 to 9 micrometers.

4. The method as defined in claim 1, wherein the substrate comprises an intermediate copper layer on at least part of the concave portion of the anode casing, and the copper layer is applied to the steel layer before the bright tin layer is electroplated onto the negative electrode casing.

5. The method as defined in claim 4, wherein the copper layer is clad to the steel layer.

6. The method as defined in claim 4, wherein the copper layer is electroplated onto the steel layer.

7. The method as defined in claim 6, wherein the copper layer is a strike layer averaging from 0.2 to 2.0 micrometers thick.

8. The method as defined in claim 7, wherein the copper layer is a strike layer averaging from 0.5 to 1.0 micrometers thick.

9. The method as defined in claim 8, wherein the copper layer is electroplated using a rack plating process, with variable contact holding of the casing and an electroplating current density from 323 to 646 amps per square meter.

10. The method as defined in claim 8, wherein the copper layer is electroplated using a plating solution comprising copper cyanide.

11. The method as defined in claim 6, wherein the copper layer comprises a copper alloy.

12. The method as defined in claim 6, wherein the copper layer is non-alloyed copper.

13. The method as defined in claim 6, wherein the negative electrode casing is cleaned and then rinsed prior to electroplating the copper layer.

14. The method as defined in claim 1, wherein the negative electrode casing has a maximum diameter or a maximum length dimension greater than 11.6 millimeters.

15. The method as defined in claim 1, wherein the steel layer is a nickel plated steel layer.

16. The method as defined in claim 1, wherein the steel layer comprises a mild steel layer.

17. The method as defined in claim 16, wherein the steel layer is a nickel plated mild steel layer.

18. The method as defined in claim 1, wherein the steel layer comprises a stainless steel layer.

19. The method as defined in claim 1, wherein the average thickness of the tin layer is less than 5 micrometers, and the substrate comprises an intermediate copper layer on at least part of the concave portion of the anode casing before the bright tin layer is electroplated onto the negative electrode casing.

20. The method defined in claim 1, wherein the tin in the layer comprising bright tin is an alloy including tin.

21. The method defined in claim 1, wherein the tin in the layer comprising bright tin is unalloyed tin.

22. The method defined in claim 1, wherein the surface of the layer comprising bright tin has a reflectance specular excluded Y parameter value from 1 to 40, when tested using a sphere spectrophotometer in the Reflectance Specular Excluded mode.

23. The method defined in claim 22, wherein the Y parameter value is from 1 to 20.

24. The method defined in claim 23, wherein the Y parameter value is from 1 to 15.

25. The method defined in claim 24, wherein the Y parameter value is from 1 to 10.

26. The method as defined in claim 1, wherein the cell has a prismatic shape.

27. The method as defined in claim 1, wherein the cell has a catalytic electrode.

28. The method as defined in claim 27, wherein the cell is a battery cell and comprises an aqueous alkaline electrolyte.

29. The method as defined in claim 28, wherein the cell is a zinc-air battery cell.

30. A method of manufacturing an electrochemical battery cell comprising the steps:
   (a) providing a sheet comprising a non-clad steel layer as a substrate;
   (b) forming a negative electrode casing from the substrate;
   (c) cleaning the negative electrode casing, and then rinsing the cleaned negative electrode casing;
   (d) electroplating an intermediate strike layer having an average thickness from 0.5 to 1.0 micrometers and comprising copper on the cleaned and rinsed negative electrode casing using a rack process with variable contact holding of the negative electrode casing;
   (e) electroplating a layer comprising bright tin and having an average thickness from 1 to 10 micrometers onto the substrate, using a rack plating process with variable contact holding of the negative electrode casing and an electroplating current density from 538 to 2691 amps per square meter;
   (f) depositing a negative electrode material comprising zinc and an aqueous alkaline electrolyte in a concave portion of the negative electrode casing such that the negative electrode material is in contact with the tin layer on the negative electrode casing; and
   (g) combining the negative electrode casing and the negative electrode material with a positive electrode and a positive electrode casing to form a sealed cell.

31. A method of manufacturing an electrochemical battery cell comprising the steps:
(a) providing a substrate comprising a sheet with a layer comprising copper clad to a layer of steel;
(b) forming a negative electrode casing from the substrate, with the layer comprising copper on a concave surface of the negative electrode casing;
(c) cleaning a surface of the layer comprising copper;
(d) electroplating a layer comprising bright tin and having an average thickness from 1 to 10 micrometers on the cleaned surface of the layer comprising copper, using a rack process with variable contact holding of the negative electrode casing and an electroplating current density from 538 to 2691 amps per square meter;
(e) depositing a negative electrode material comprising zinc and an aqueous alkaline electrolyte in a concave portion of the negative electrode casing such that the negative electrode material is in contact with the tin layer on the negative electrode casing; and
(f) combining the negative electrode casing and the negative electrode material with a positive electrode and a positive electrode casing to form a sealed cell.

* * * * *